United States Patent [19]

Rasinski et al.

[11] Patent Number: 4,959,015
[45] Date of Patent: Sep. 25, 1990

[54] SYSTEM AND SIMULATOR FOR IN-FLIGHT THREAT AND COUNTERMEASURES TRAINING

[75] Inventors: John E. Rasinski; Christian P. Delong, both of Albuquerque, N. Mex.

[73] Assignee: Honeywell, Inc., Minneapolis, Minn.

[21] Appl. No.: 286,116

[22] Filed: Dec. 19, 1988

[51] Int. Cl.⁵ .......................... G01S 7/40; G09B 9/40
[52] U.S. Cl. .......................................... 434/2; 347/169
[58] Field of Search .................... 434/2, 3, 5; 342/169

[56] References Cited

U.S. PATENT DOCUMENTS

| | | |
|---|---|---|
| 3,571,479 | 3/1971 | Horattas et al. |
| 3,573,339 | 4/1971 | Flower et al. |
| 3,604,828 | 9/1971 | Perkovich |
| 3,894,347 | 7/1975 | Steven et al. |
| 4,017,985 | 4/1977 | Heartz |
| 4,070,769 | 1/1978 | Hollis |
| 4,192,082 | 3/1980 | Deaton et al. ........................... 434/2 |
| 4,424,038 | 1/1984 | Tingleff et al. ......................... 434/2 |
| 4,666,407 | 5/1987 | Jones ....................................... 434/2 |

Primary Examiner—Thomas H. Tarcza
Assistant Examiner—John B. Sotomayor
Attorney, Agent, or Firm—Arnold L. Albin

[57] ABSTRACT

An interactive trainer for electronic countermeasures simulation capable of providing displays of in-flight threats and countermeasures responses representative of an actual combat equipment suite. Threat scenarios are stored in computer memory and recalled at a push-button display console. Default parameters may readily be modified by the operator under software control. The aircraft position with respect to selected threats is displayed in real time superposed on the threat parameters. Displays are identical to that provided by the equipment simulated and reflect the true operational status as preset by the operator.

9 Claims, 6 Drawing Sheets

SYSTEM AND SIMULATOR FOR IN-FLIGHT THREAT AND COUNTERMEASURES TRAINING

This invention was made with United States Government support and the United States Government has certain rights therein.

BACKGROUND OF THE INVENTION

1. Field of the Invention

The invention relates to electronic countermeasures simulation, and more particularly to an interactive simulator for training a pilot using on-board electronics for simulating in-flight threats and countermeasure responses.

2. Description of the Prior Art

Military aircraft operating under hostile conditions encounter enemy action intended to destroy the aircraft. Such action may be from ground based weapons, such as anti-aircraft fire, ground-to-air missiles or fighter aircraft carrying air-to-air missiles. To combat enemy tactics, the attacked aircraft may resort to electronic countermeasures, such as jamming tracking radar and missile emissions, deceptive measures such as flares to deflect infra-red missiles or chaff to confuse radar, and evasive maneuvers.

The effectiveness of an aircrafts' threat warning and countermeasures system depends not only on the quality of the system, but on the ability of the pilot to operate it effectively, at present, to train pilots in the use of onboard countermeasures equipment, enemy threats are simulated using ground-based emitters over which the trainee-pilot flies to simulate flying over enemy threats. Such physical simulator embodiments are expensive to build and maintain, training is limited to a few locations where facilities are based, and their emissions can be monitored to provide an enemy with information as to the extent of our knowledge base of enemy threat systems.

Previous attempts to provide realistic in-flight threat warning and countermeasures training have met with limited success in that extensive modifications to aircraft electronics were required and the threats were not interactive; that is, they did not automatically reflect operator actions or move realistically as a real threat would, and imposed a substantial workload on the trainer. Since the training scenario had to be run manually, it frequently resulted in a poor training outcome due to nausea, vertigo and fatigue induced in the trainer.

The present invention utilizes an existing control and display system and countermeasures integration terminal and is activated by predetermined scenarios programmed via software which may be modified by the operator. The countermeasures integration terminal recovers data from and provides commands to the countermeasures receiver and active countermeasures devices and provides an integrated display showing the selected targets and the status thereof in symbolic form. The display scenario may be superimposed on a normal cockpit instrument display if desired. The scenario is stored within a digital memory embedded within the terminal. Once initiated, a scenario is fully automatic, leaving the pilot-trainee free to concentrate on flying and the instructor free to teach the pilot how to defeat threats as they appear. A library of scenarios permits multiple threats to be displayed if desired. The interactive operation reflects aircraft maneuvers and pilot countermeasures in the display, while providing fail-safe operation by disabling the simulator in the event a real threat is encountered during flight training.

SUMMARY OF THE INVENTION

In accordance with the present invention, an operator training system and simulator for training in aircraft threat warning and countermeasures, wherein the aircraft is equipped with sensors for detecting electromagnetic emissions and active devices for countering detected threats, comprises digital data storage means for receiving data representative of predetermined threat scenarios, trainer control means for manually generating digital data in order to select a predetermined threat scenario, and display means connected to receive data from the data storage means and to display scenarios selected by the control means. The system further includes a computer processor circuit and digital image data processor means controlled by information from the computer processor circuit for generating displayable symbols corresponding to the threat scenario, an audio-frequency generator circuit controlled by information from the computer processor circuit for producing audible signals corresponding to the threat scenario, and data input means responsive to navigational data and pilot-trainee input data for entering information to the computer processor circuit varying in response to the simulated conditions provided through the execution of a selected threat scenario, and for interactively controlling the display means according to the responses.

DESCRIPTION OF THE PREFERRED EMBODIMENT

Figure 1:
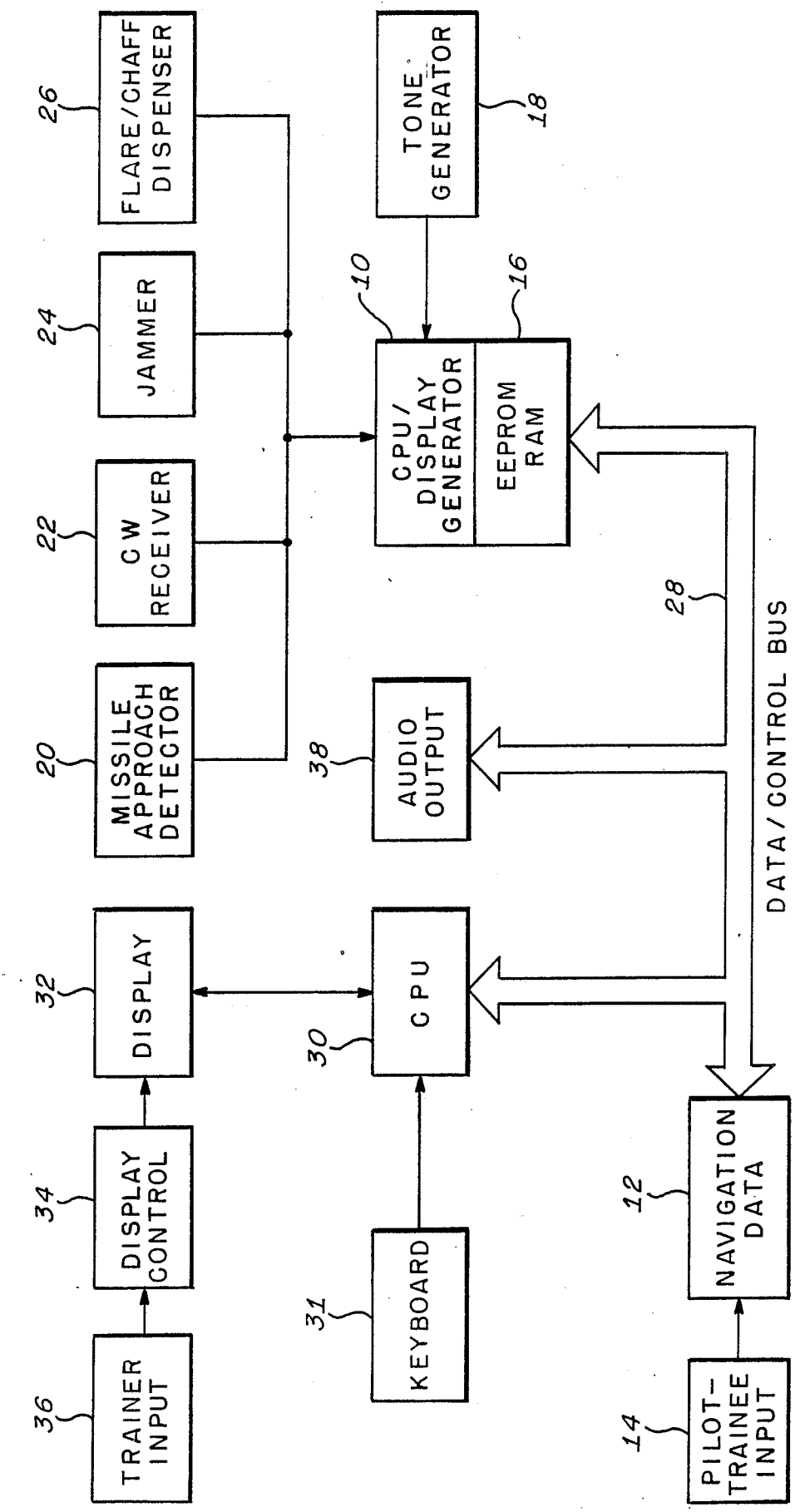
FIG. 1 is a block diagram showing the system configuration of a preferred embodiment of the invention.

Referring now to FIG. 1, which shows a preferred embodiment of the present invention, there are shown a control processing unit (CPU) 10 including a digital computer and adapted to generate display symbology and control a plurality of predetermined threat scenarios for simulating a desired threat condition and interactively responding to command inputs from a source of navigational data 12, such as present position; airspeed, heading, and altitude, and input commands from a pilot-trainee 14, which may include maneuvering of the aircraft and operation of manual controls and switches. Associated with CPU 10 is a digital memory 16, which includes an electrically programmable memory (EEPROM) into which desired scenarios may be stored in accordance with a known tactical situation and a random access memory (RAM) for temporary storage of dynamically changing digital data. The CPU 10 also controls a tone-generator 18 for producing audible signals in accordance with the threat scenario. Such signals may indicate the appearance of a threat, activation of countermeasures, successful intervention, etc.

Also coupled to the CPU 10 is a suite of electronics equipment adapted for sensing of electromagnetic emissions and for emitting jamming emissions on corresponding wavelengths or dispensing active countermeasures such as flares and chaff. The sensors may include, for example, a missile approach detector 20, a cw receiver 22, a jammer 24, which may include a cw jammer, a pulsed radar jammer, or infra-red jammer, and a dispenser 26 for releasing flares or chaff.

A data and control bus 28 couples command signals from pilot-trainee input 14 and navigational data 12 to the CPU 10 for interacting with a predetermined scenario, and returns data signals representative of the scenario to a second control processing unit CPU 30. CPU 30 includes a digital computer and memory for receiving a manual command from a keyboard 31 which generates a digital signal to enter the simulation mode or revert to normal operation. CPU 30 is coupled to a suitable display unit 32, which may be a cathode ray tube, for providing a visual representation of the scenario in the simulator mode, or for a display corresponding to cockpit instruments in the normal mode.

The display unit 32 is operatively controlled by display control 34 which may comprise a plurality of push-buttons associated with computer generated symbology identifying their function. Trainer input 36 activates the push-buttons to select a desired scenario and modify the internally programmed default settings. The scenario may be superimposed upon a positional display, as in FIG. 3, to show threat warnings on a horizontal situation (azimuth) display. The scenario may also be superimposed upon a cockpit instrument display together with threat warnings and jammer status. The threat display may be superimposed upon other representative display format which the pilot is capable of calling up, such as communications, control, waypoint planning, etc.

CPU 10 has the capability of monitoring the operative condition of devices 20–26 and disabling operation of the simulator in the event of an actual hostile situation being detected. Further, memory 16 can store a scenario which has been set up even though the system is powered down. This will allow repetitive training without the need for reentering the scenario.

Bus 28 provides an audio signal from tone generator 18 to an audio output transducer 38, which may be a loudspeaker or buzzer.

The operation of the training system and simulator thus constituted will now be described with reference to FIGS. 2 and 3.

Figure 2:
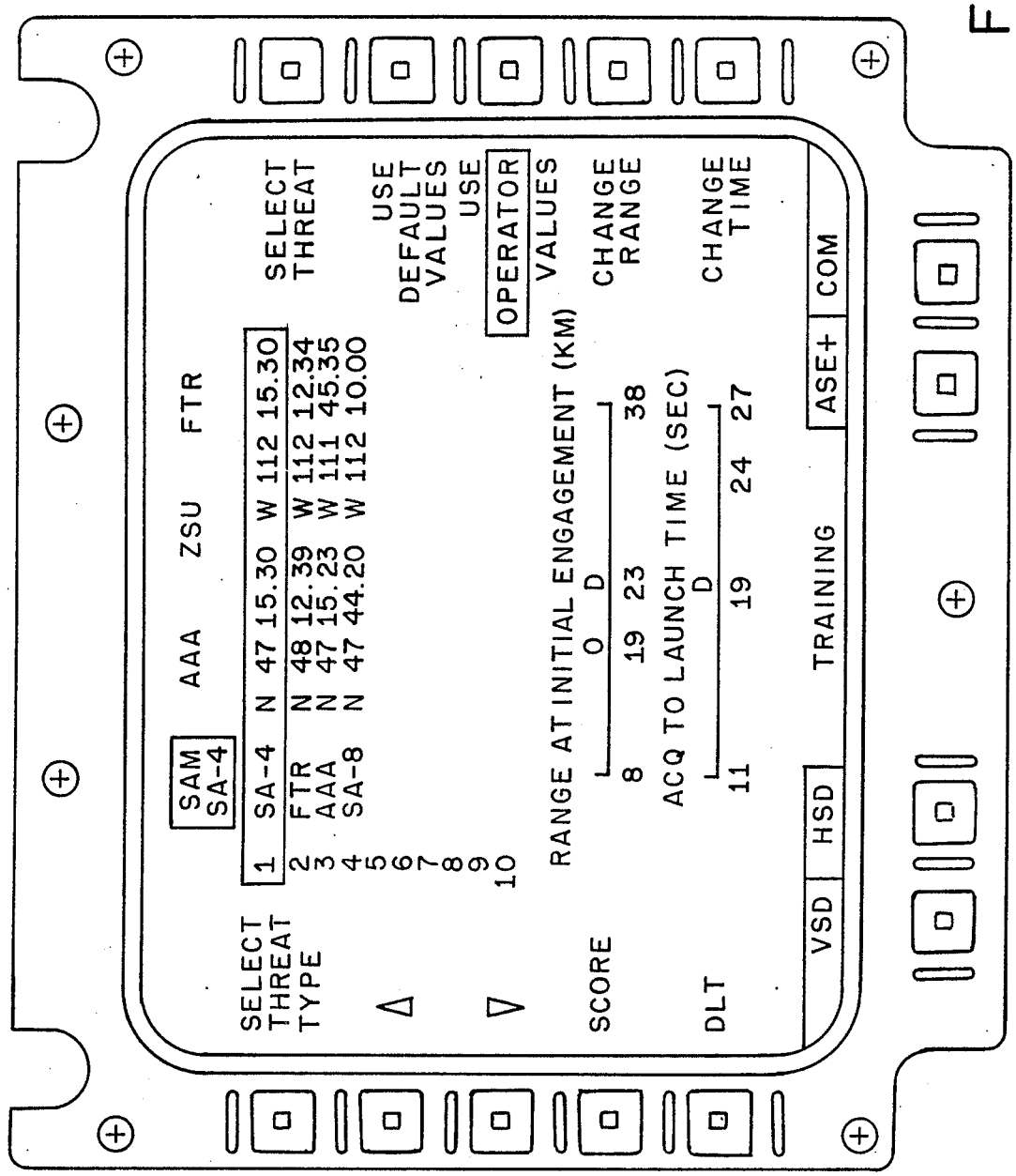
FIG. 2 is a schematic representation of the display face of the display unit showing the set up of a simulated countermeasures scenario in the mission summary mode.

FIG. 2 is a mission summary page which represents one of a plurality of scenarios which correspond to ground-to-air or air-to-air threats. The example selected is a surface-to-air missile (SAM), which is purely illustrative and not to be construed as limiting The SA-4 SAM has been selected as the threat, denoted by the boxed area. Coordinates of the launcher are shown as north 47, 15' 30" and west 112, 15' 30" with respect to the aircraft's position which places the threat within range of the flight planned route. These values are a default value, and new values may be entered by the trainer-instructor if desired. The operational characteristics of the SAM are seen to be a minimum range at initial engagement of 8 KM and a maximum range of 38 KM. A default value at the midpoint is 23 KM, and the operator has elected to override the default and use a value of 19 KM. The time from acquisition of the target aircraft to launch ranges between 11 and 27 seconds, with a default value of 19 seconds, and an operator selected value of 24 seconds. These values are shown on the scales of FIG. 2 with defaults denoted by "D" and operator selected values by "O". The operator may choose to enter any value of range and acquisition to launch times between the minimum and maximum values shown.

As the aircraft proceeds along its route and gets within 19 KM of the threat, the threat scenario automatically begins. When within range, the simulator will start acquisition and the launch sequence. If there is no launch until maximum range is exceeded, the engagement will be discontinued.

Figure 3:
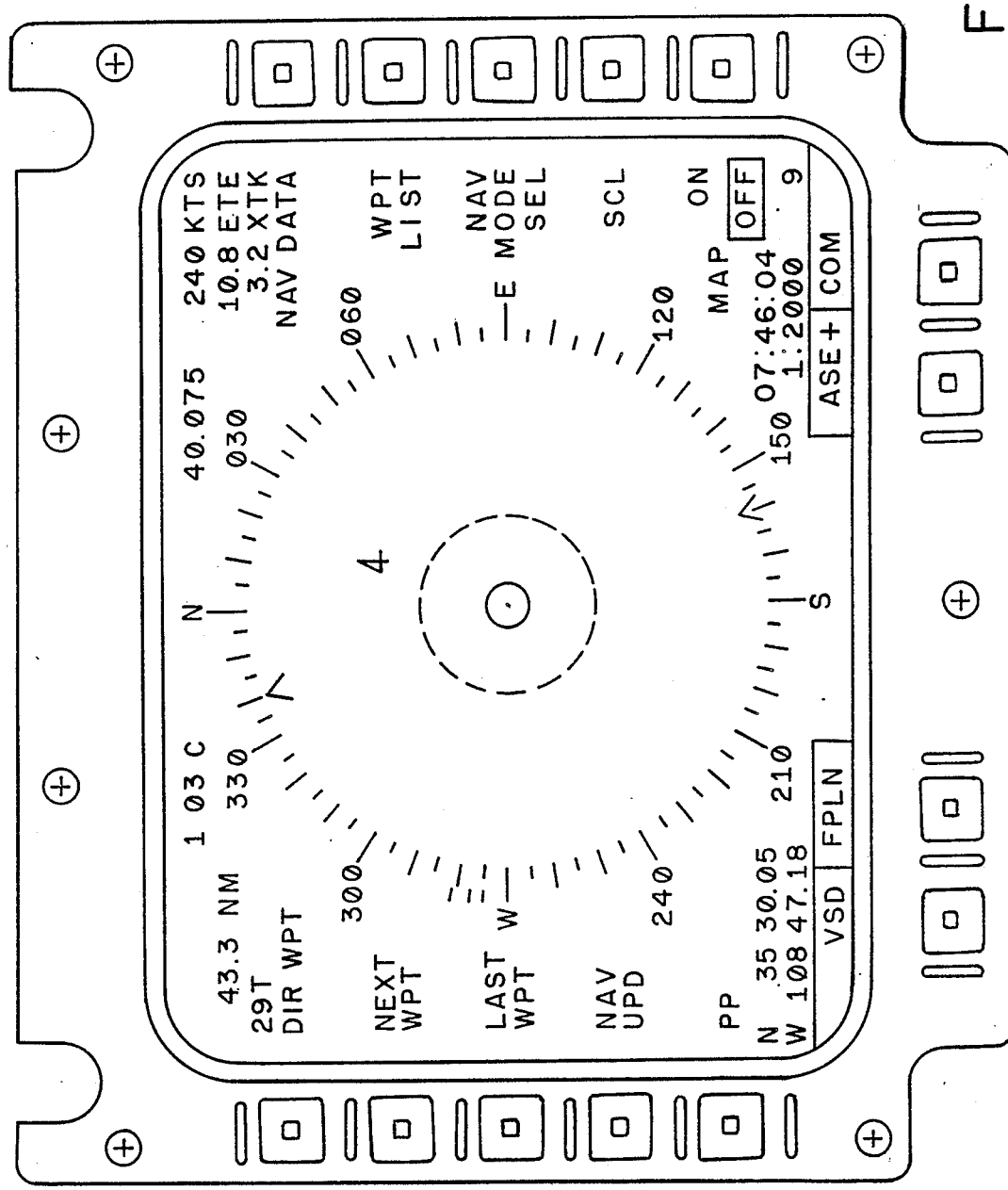
FIG. 3 is a horizontal situation display showing the appearance of a simulated threat on the display unit.

When the threat is detected, the display will appear as in FIG. 3. The relative location of the threat is indicated by the numeral "4", which corresponds to a predetermined threat condition known to the pilot-trainee. As the aircraft approaches the threat, the position of the threat will be shown on the moving display. The sequence of events followed in the example scenario is determined by whether a jammer has been enabled or disabled. If the jammer is on, when the threat comes up in the display and is within jamming range, an "X" will appear on the threat reference numeral, based upon an algorithm which takes into effect aircraft altitude and a probability of successful jamming, indicating it has been effectively countered. If the appropriate jammer is off, the pilot has a choice of dispensing chaff or flares to deceive the radar or homing missile and maneuvering the aircraft out of range, turning the jammer on, or taking no action. If chaff is effective against this type of target, assuming a radar-homing missile, the threat will be countered within a predetermined time period after dispensing the chaff. However, since a reacquisition may occur the pilot should continue his evasive action until out of range.

If the threat comes up and the aircraft is in range, but the pilot has taken no action, the acquisition to launch timer will start. The threat launches at the end of the launch sequence, and the flyout time to interception with the aircraft is calculated. At flyout time minus 5 seconds, a "MISSILE APPROACH" warning signal will be displayed. In advance of impact, a flare may be dispensed by the pilot to deceive a heat-seeking missile, and the threat will be unsuccessful in achieving a lock-on. Indications to the pilot-trainee will be as if a real encounter were occuring, the displays simulating the actual displays of the countermeasures suite.

Figure 4:
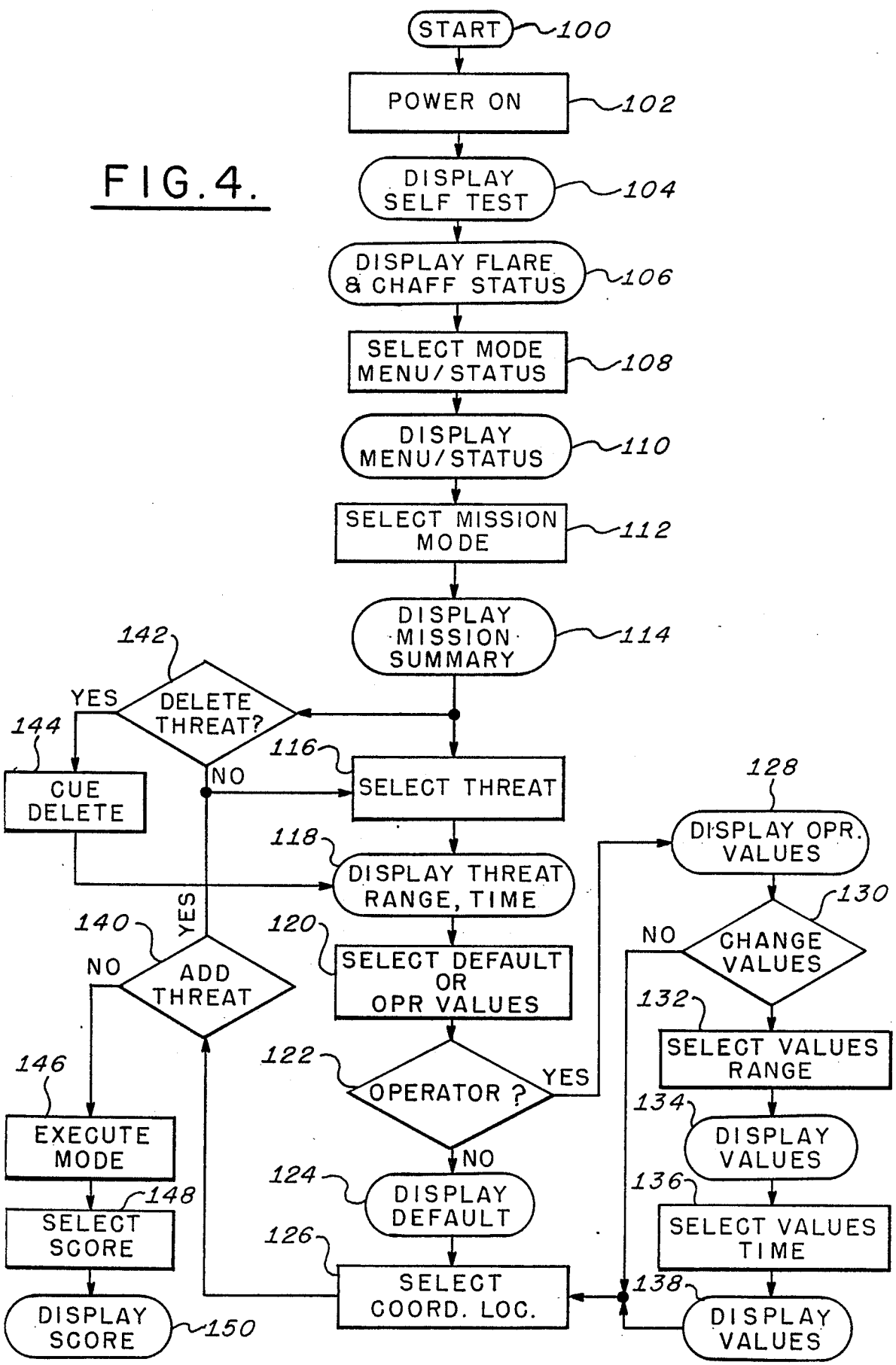
FIG. 4 is a flow chart showing the steps of operating the simulator display unit during the execution of a simulated countermeasures scenario.

Referring now to FIG. 4, there is shown a flow chart wherein the steps in operating the display simulator controls are illustrated in the case of executing a scenario.

After starting the routine at block 100, the power switch 102 is activated. The system then goes through a built-in self-test exercise. If the operator presses a push-button to activate one of the on-board jammers or receivers, he will see a test pattern and hear audio tones associated with the test pattern. The pattern appears on the display 104. The flare and chaff dispenser status can be observed in a similar manner by exercising their respective push-buttons and observing display 106. To activate the system's scenario or to practice equipment turn-on in the training mode, menu/status 108 is selected. This will cause a display 110, as in FIG. 5. For example, depressing the switch for the missile approach receiver MISSILE APPR would change the display from OFF to WARM-UP. After the warm-up period is completed, the legend below MISSILE APPR will change to ON. The sequence of button activation and the resulting display is identical to that when the equipment is in operational use, rather than in a training mode. In addition, all of the threat encounter scenarios will react interactively in accordance with the status of the countermeasures system. Thus, if the missile approach receiver is in standby, it will not function in the threat scenario.

Figure 5:
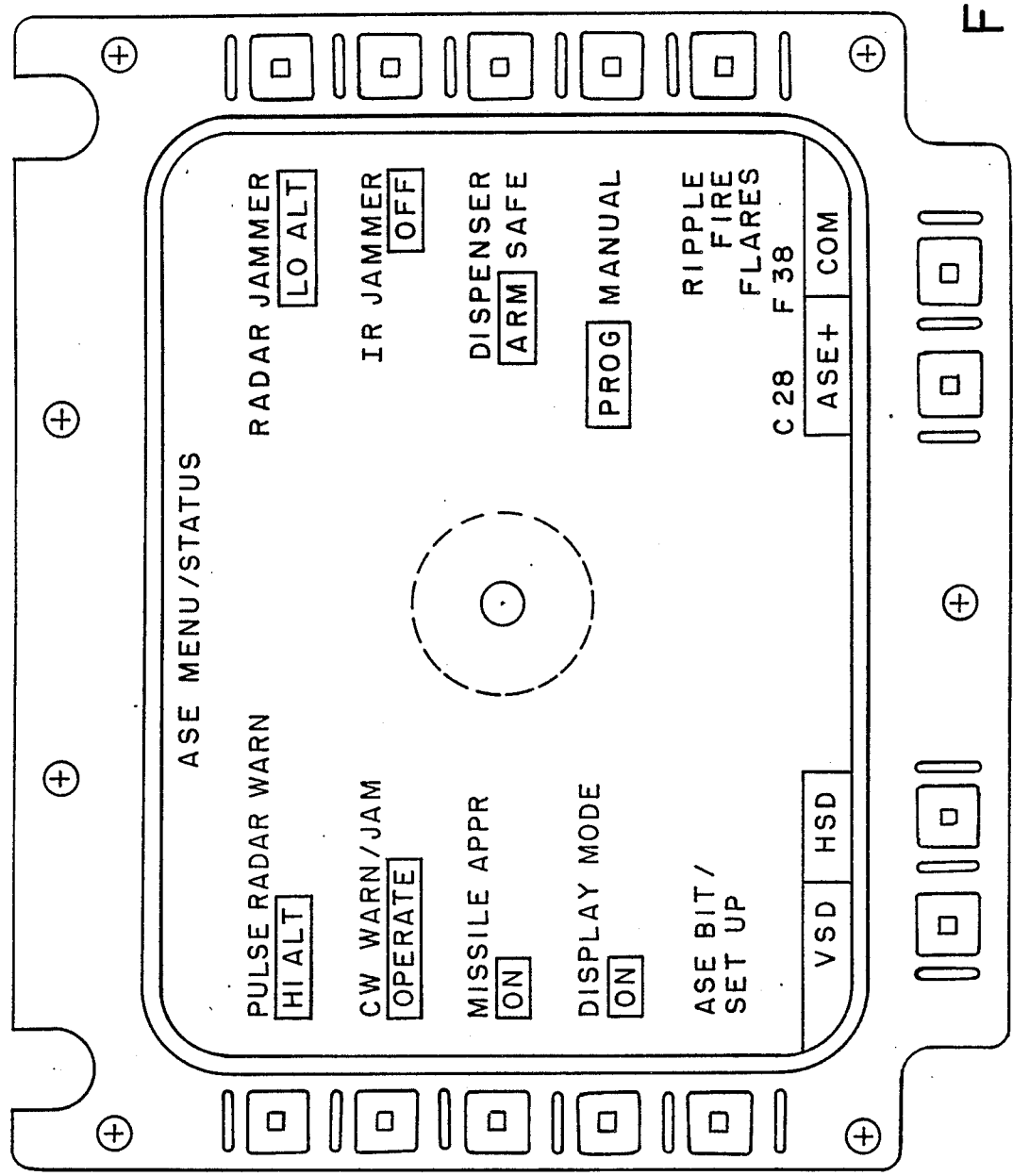
FIG. 5 is a schematic representation of the display face of the display unit in the menu/status mode, showing countermeasures equipment selection legends.
Figure 6:
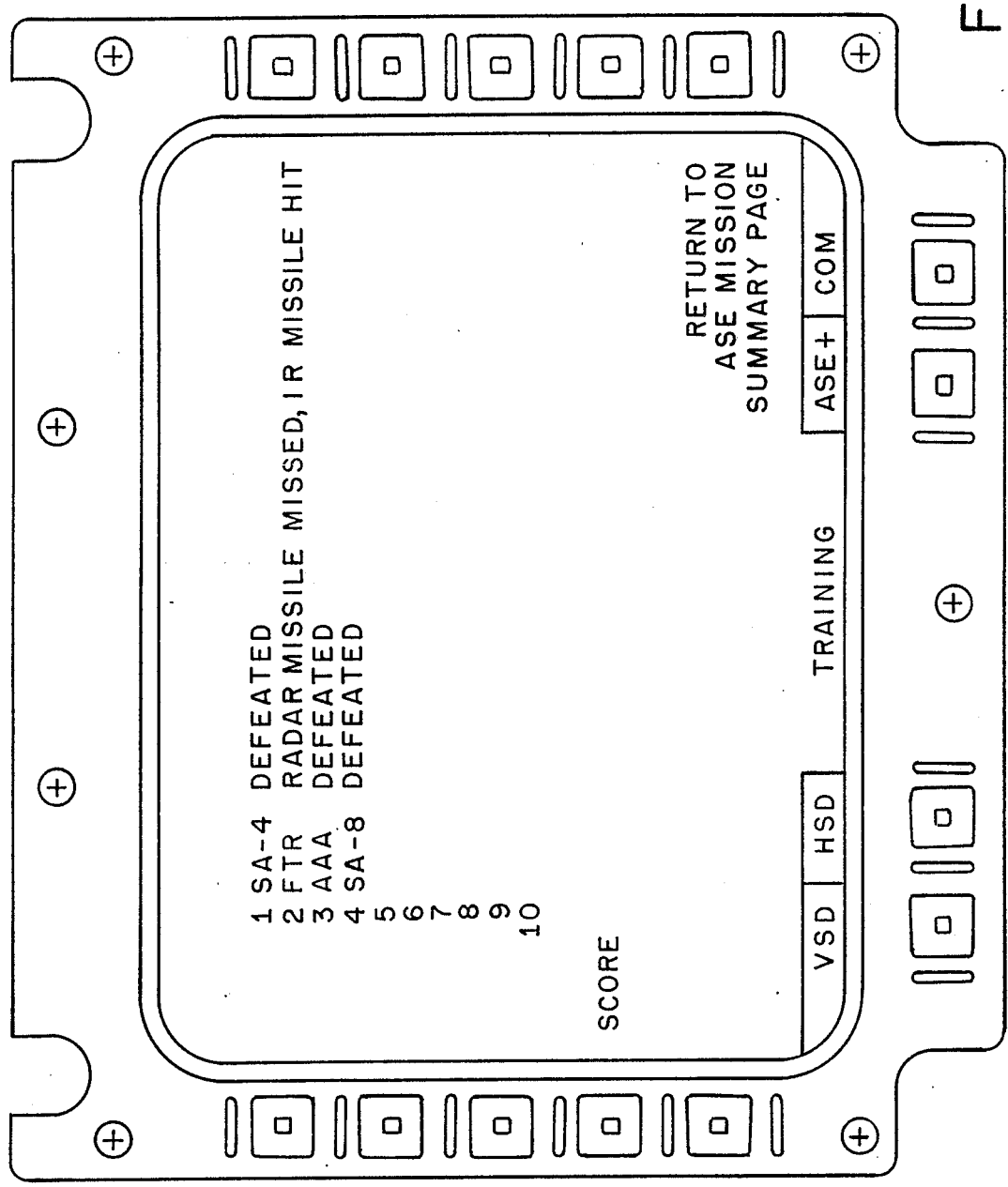
FIG. 6 is a schematic representation of the mission score page of the display face of the display unit.

In operation, the pilot-trainee will select the desired mission equipment 112 and the mission/status display 114 will be updated as in FIG. 5. FIG. 2 shows the mission summary display wherein four threats have been entered. Threats are entered by repeated depression of a push-button to cycle through the entry table, as at block 116. If it is desired to delete a threat that has previously been entered, delete cue 144 is pressed to obtain an updated display 118. Note, as discussed above, the operator may select default values 120 or enter new values 122 within the displayed predetermined limits which characterize the countermeasures system. If default values are selected display 124 is updated by selecting coordinates 126. The operator may then repeat the loop by adding additional threats 140 up to a total of 10 threats. In the present system, while 10 threats may be available, only two can be activated at any one time. If the operator is satisfied with the scenario that has been setup, he then activates the execute mode 146. After a simulated threat is encountered, the system will compute a score value which may be displayed to the pilot-trainee, as in FIG. 6. Should the operator desire to modify the default setup values, he may do so by changing range to initial engagement 132 or acquisition time to launch 136, which values are displayed and provided to block 126 where coordinate values may also be modified.

While the invention has been described in its preferred embodiments, it is to be understood that the words which have been used are words of description rather than limitation and that changes may be made within the purview of the appended claims without departing from the true scope and spirit of the invention in its broader aspects.

Embodiments of an invention in which an exclusive property or right is claimed are defined as follows:

1. An operator training system and simulator for training in aircraft threat warning and countermeasures, said aircraft having a plurality of sensors for detecting electromagnetic emissions and active elements for countering detected threats, comprising:
   (1) countermeasures integration terminal unit, coupled to control said sensors and said active elements, for selectively providing digital data corresponding to a normal cockpit instrument display or to a given threat scenario, said terminal unit further comprising:
      (a) flight programmable digital data storage means for receiving data representative of predetermined threat scenarios,
      (b) digital image data processor means for generating displayable symbols representative of said threat scenario and corresponding to a normal cockpit instrument display,
   (2) trainer input control means for manually generating digital data in order to select a predetermined threat scenario or a normal cockpit instrument display,
   (3) display means coupled to receive data from said data storage means and to display scenarios or a cockpit instrument display as selected by said control means,
   (4) a computer processor circuit responsive to said control means for controlling said display means,
   (5) an audio-frequency generator circuit controlled by information from said computer processor circuit for producing audible signals corresponding to said threat scenario, and
   (6) data input means responsive to navigational data and pilot trainee input data for entering information to said computer processor circuit varying in response to the simulated conditions provided through the execution of a selected threat scenario, and for interactively controlling said display means according to said responses,
   said training system and simulator further comprising means for coupling said sensors and said active elements to said computer processor circuit for indicating an operational status thereof on said display, and for inhibiting generation of said threat scenario when at least one of said sensors or said active elements is in an operational status indicative of reception of said electromagnetic emissions or actuation of said active elements.

2. A training system and simulator as set forth in claim 1, wherein said predetermined threat scenario is superimposed upon a cockpit instrument display.

3. A training system and simulator as set forth in claim 2, said predetermined threat scenario including a status mode for displaying a menu indicative of the operational status of said sensors and said active elements.

4. A training system and simulator as set forth in claim 3, said predetermined threat scenario including a mission summary mode for reviewing threat conditions previously selected and for entering or deleting ones of a plurality of threat conditions.

5. A training system and simulator as set forth in claim 4, said mission summary mode including a default threat condition comprised of a predetermined threat scenario superimposed upon operator entered threat conditions, said trainer control means including means for said operator entered conditions assuming priority over corresponding default threat conditions.

6. A training system and simulator as set forth in claim 5, wherein said predetermined threat scenario includes a simulation of a surface-to-air missile, an aircraft fighter, anti-aircraft artillery, or other predetermined ground based weapons.

7. A training system and simulator as set forth in claim 6, wherein a predetermined threat scenario as modified by operator entered data is stored for future recall in said digital data storage means upon power down of the system.

8. A training system and simulator as set forth in claim 1, wherein said computer processor circuit comprises a
   first processing circuit for controlling said sensors, said active elements, said digital data storage means and said digital image data processor means, and a second processing circuit for controlling said trainer control means and said display means, said first processing circuit controlling said default and operation modified scenarios for executing manually generated digital data designated by said trainer control means and pilot and navigational data applied thereto.

9. A training system and simulator as set forth in claim 7, wherein said display means has a character display corresponding to said manually generated digital data and to threat conditions and responses thereto subsequently executed and displayed.

* * * * *